Figure 1:
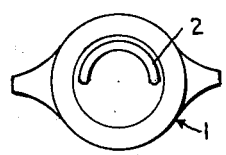

March 3, 1953     R. B. BATTERSBY     2,630,238
TEAR OUT CLOSURE

Filed May 9, 1949                                      2 SHEETS—SHEET 1

INVENTOR.
ROBERT B. BATTERSBY
BY
AGENT

March 3, 1953 R. B. BATTERSBY 2,630,238
TEAR OUT CLOSURE

Filed May 9, 1949 2 SHEETS—SHEET 2

INVENTOR.
ROBERT B. BATTERSBY
BY
AGENT

Patented Mar. 3, 1953

2,630,238

UNITED STATES PATENT OFFICE 2,630,238

TEAR OUT CLOSURE

Robert B. Battersby, Darien, Conn., assignor to PM Industries, Incorporated, a corporation of Connecticut Application May 9, 1949, Serial No. 92,175

2 Claims. (Cl. 220—27)

This invention relates to container seals in which the sealing cap is disrupted by tearing the pre-formed container cap.

The usual method of construction of caps for bottles and other types of containers opened by means of tearing or disrupting the metal is shown in U. S. Patent 1,170,152, to Heath, wherein a metal cap is formed and seated upon the top of the bottle and then deformed to make a positive seal. This metal cap has a perforated flange which may be torn to release the metal ring holding the sealing device. Another type of cap commonly used is the so-called crown seal, U. S. Patent 2,180,056, to Hunt, discloses a seal of this type whereon is attached a lever to depress the center of the crown and force up the edge of the crown to remove the seal without the usual supplemental instruments. U. S. Patent 1,742,809 to Hoover shows a package for the dispensing of liquid medicine. This package consists of elastic material with an integral cavity having an orifice for the introduction and discharge of the liquid medicine.

The object of the present invention is to provide a sealed container wherein the opening means is pre-fabricated in the container. This is made an integral part thereof and the filling means of the container is not the same as the opening means and is sealed separately.

It is a further object of this invention to provide a closure for bottles or other types of containers wherein the closure means is fastened about the neck of the container. The opening means is a prefabricated integral part thereof.

A still further object of this invention is to form a container for a one-use quantity of material that may be positively hermetically sealed and readily opened to remove the contents thereof for immediate use.

According to the present invention a container is formed of a plastic material such as rubber, poly-ethylene, polyvinyl chloride, cellulose acetate, nylon or any tearable plastic material so as to contain an opening means molded into the container and made a part thereof, to insure the positive seal for this part of the article. This article is then filled and the filling opening permanently sealed. This gives a positive protection to the contents.

This invention comprises a closure made of plastic material which is opened by tearing. Plastics of all types are torn with difficulty depending upon the thickness of the material and the resistance to initial tear. The device disclosed in this application comprises a thin section cast with two thick sections adjoining. One of the thick sections being shaped to be removed by tearing the thin section, has attached thereto a means for initiating the action and removing the removable section.

Figure 2:
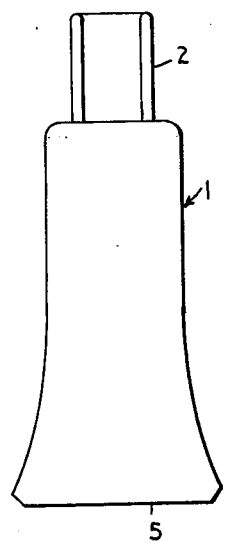
Figure 3:
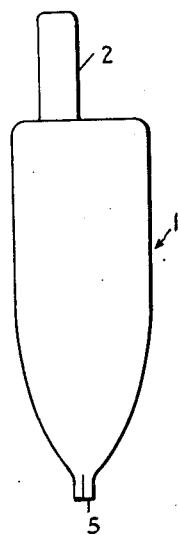
Figure 4:
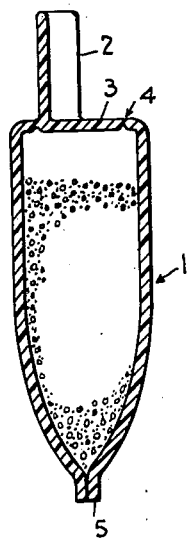
Figure 7:
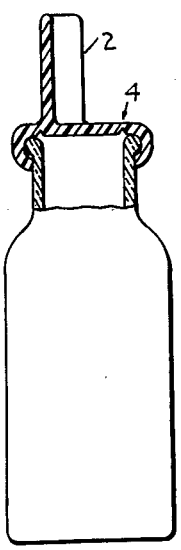
Figure 5:
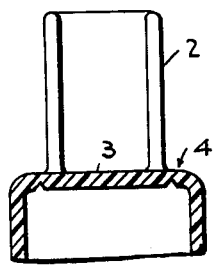
Figure 6:
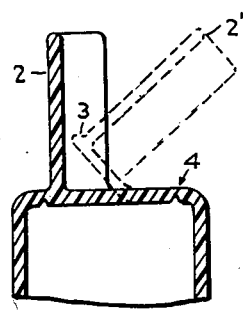
Figure 8:
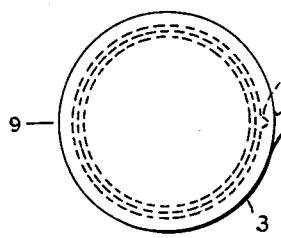
Figure 11:
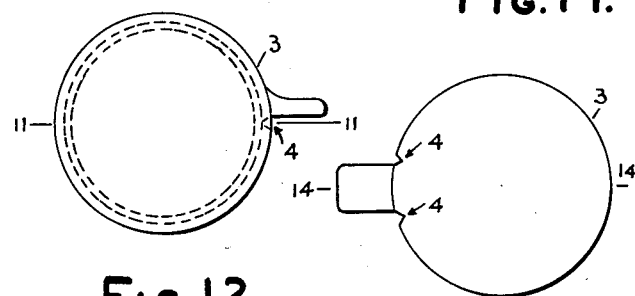
Figure 14:
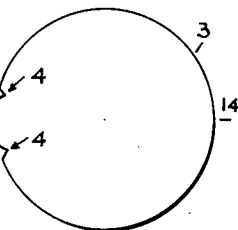
Figure 9:
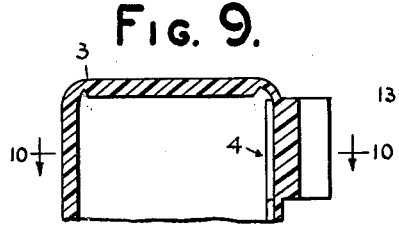
Figure 12:
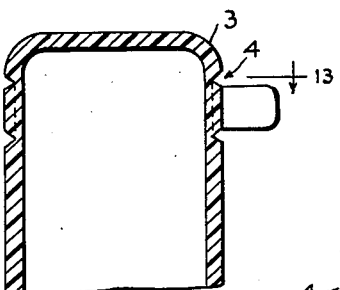
Figure 15:
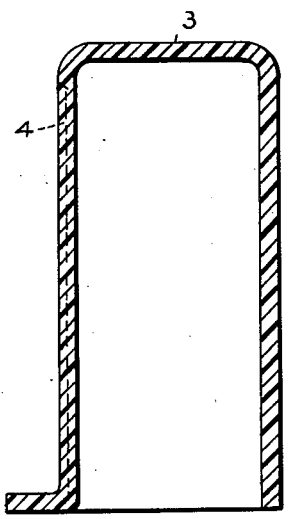
Figure 10:
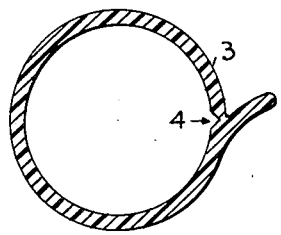
Figure 13:
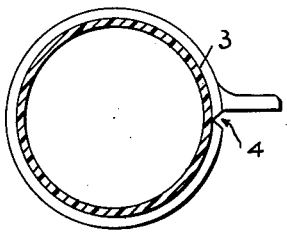
Figure 16:
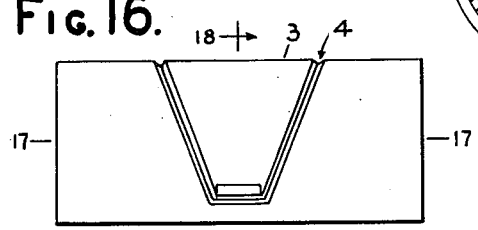
Figure 18:
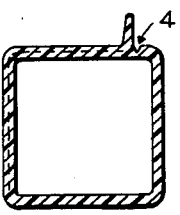
Figure 19:
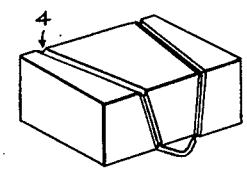
Figure 17:
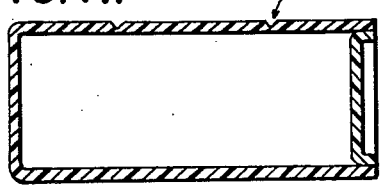

For a fuller understanding of the nature and the object of the invention, reference should be had to the following detailed description taken in conjunction with the accompanying drawings in which:

Fig. 1 is an end view of a plastic container;
Fig. 2 is a front view of the container;
Fig. 3 is a side view of the container;
Fig. 4 is a longitudinal sectional view of the cap shown in Fig. 1;
Fig. 5 is a longitudinal sectional view of the top showing the opening means;
Fig. 6 is an additional longitudinal sectional view of the top showing the opening means displaced;
Fig. 7 shows the device applied to a bottle, the top part being in section;
Fig. 8 is a plan view of the device as applied to a bottle;
Fig. 9 is a sectional view taken on line 9—9 of Fig. 8;
Fig. 10 is a sectional view taken on the line 10—10 of Fig. 9;
Fig. 11 is a plan view of the device as applied to a bottle top;
Fig. 12 is a sectional view taken on line 11—11 of Fig. 11;
Fig. 13 is a sectional view taken on line 13—13 of Fig. 12;
Fig. 14 is a plan view of the device as applied to a bottle top;
Fig. 15 is a sectional view taken along the line 14—14 of Fig. 14;
Fig. 16 is a front view of a plastic box having a tear opening;
Fig. 17 is a sectional view taken on the line 17—17 of Fig. 16;
Fig. 18 is a sectional view taken on line 18—18 of Fig. 16; and
Fig. 19 is a view in isometric projection of the box shown in Fig. 16.

Similar reference numerals throughout the various views indicate the same parts. The drawing shows a container 1, made of molded plastic material, in which is molded an opening lever 2 attached to section 3 having a thin periphery defining the desired line of tear thereof, 4, so that when the lever 2 is depressed as shown in Fig. 6, 2, 2', the section 3 will be torn at the thin periphery thereof leaving an opening corresponding to the shape and size of the area partially or completely outlined by the thin section 4 through which opening the contents of the container may be removed. This device, as shown in the figures discussed above, consists of a unitary container with the opening means molded or made a part thereof and sealed as shown at 5 in Figs. 2, 3 and 4.

Whereas this embodiment of the invention is shown and discussed above, the invention may also be applied to rigid containers wherein the closure means is sealed to the top thereof as shown in Fig. 7. The precast tearable part with the thin section 4 defining the center section 3, as shown in Fig. 7, has the projection 2 attached thereto, said cap being attached by means of heat, solvent, or other suitable methods to the top of this rigid container.

Another type of closure for rigid articles or a type of opening for a rigid container circular in cross section is shown in Figs. 8 to 15 inclusive wherein the notch 4 defining the weakened section, which may be removed by tearing, is shown on the interior of Figures 8, 9 and 10 and on the exterior of Figures 11, 12, 13, 14 and 15. In Figures 11, 12 and 13 the tear along the notch 4 will remove the top section 3 allowing the contents to be removed therefrom.

In Figures 14 and 15 the tear along the notch 4, 4' running lengthwise of the closure will allow the removal of the entire closure means.

Figures 16, 17, 18 and 19 show a box made of flexible or semi-rigid construction having a tear opening defined in the side of the box by the notch 4, which, when torn along this notch, will remove the opening section 3 and allow access to the contents of the box.

This invention as described above has an opening means cast into the container giving a positive controllable sealing means which is capable of being opened at will and is not capable of being resealed. The advantages of a non-resealable closure are many and need not be set forth, as they are well known to all skilled in the art. The use of plastic containers has been limited in the past by the difficulty in sealing, this difficulty being aggravated by attempting to seal into the article after it is filled a closure means which may be reused as an opening means, but to have the two of them in separate parts of the article so that the opening means may be preformed and not complicate the closing or sealing of the container after it has been filled, is one of the many advantages that have been disclosed in this invention.

Another feature which is found in this invention, is a method of opening by tearing the material from which the entire container is made. That is, the container is made of one continuous type of material and has a portion thereof preformed to allow a predetermined opening to be made therein.

Whereas the above embodiment of this invention has been disclosed as illustrative thereof, it is readily seen by any one skilled in the art that it has many applications in all types of cast plastic containers or closing means made of cast plastic for rigid containers.

What is claimed is:

1. A plastic container having a curved groove in its inner surface defining a tear out portion and a rigid tab arcuate in cross section integrally attached to the outer surface of the tear out portion having its outer curved surface conforming to said groove and alined with one edge thereof.

2. A plastic container having a plane surface and a closed curved groove in said surface defining a tear out portion and a rigid tab of correspondingly curved cross section attached to and at right angles to the outer surface of the tear out portion, said tab having its outer surface registering with a portion of said groove.

ROBERT B. BATTERSBY.

REFERENCES CITED

The following references are of record in the file of this patent:

UNITED STATES PATENTS

| Number | Name | Date |
|---|---|---|
| 1,327,190 | Bigoney | Jan. 6, 1920 |
| 1,475,908 | Walsh | Nov. 27, 1923 |
| 1,542,944 | Kawasaki | June 23, 1925 |
| 1,601,618 | Haas | Sept. 28, 1926 |
| 2,029,131 | Shoemaker | Jan. 28, 1936 |
| 2,157,646 | Barker | May 9, 1939 |
| 2,180,055 | Hunt, Jr. | Nov. 14, 1939 |
| 2,397,051 | Scherer | Mar. 19, 1946 |
| 2,487,400 | Tupper | Nov. 8, 1949 |